United States Patent
Kim et al.

(10) Patent No.: US 8,655,413 B2
(45) Date of Patent: Feb. 18, 2014

(54) MOBILE TERMINAL AND METHOD OF SETTING ITEMS USING THE SAME

(75) Inventors: Junhee Kim, Seoul (KR); Eunkyung Choi, Seoul (KR); Hyekyung Park, Seoul (KR); Kyunghye Seo, Seoul (KR); Sunjung Lee, Seoul (KR); Jihyc Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 12/713,526

(22) Filed: Feb. 26, 2010

(65) Prior Publication Data
US 2011/0065478 A1     Mar. 17, 2011

(30) Foreign Application Priority Data
Sep. 14, 2009  (KR) .................. 10-2009-0086409

(51) Int. Cl.
*H04M 1/00*     (2006.01)

(52) U.S. Cl.
USPC .............. 455/566; 455/575.1; 455/550.1

(58) Field of Classification Search
USPC .................... 455/566, 575, 1, 550.1
See application file for complete search history.

(56) References Cited

U.S. PATENT DOCUMENTS

| | | | |
|---|---|---|---|
| 2007/0028187 A1* | 2/2007 | Katsuyama | 715/810 |
| 2007/0152958 A1* | 7/2007 | Ahn et al. | 345/156 |
| 2009/0282369 A1* | 11/2009 | Jones | 715/848 |
| 2010/0020035 A1* | 1/2010 | Ryu et al. | 345/173 |
| 2010/0050129 A1* | 2/2010 | Li et al. | 715/849 |
| 2010/0169836 A1* | 7/2010 | Stallings et al. | 715/848 |
| 2011/0053675 A1* | 3/2011 | Aoki et al. | 463/20 |

* cited by examiner

*Primary Examiner* — Nghi H Ly
(74) *Attorney, Agent, or Firm* — Birch, Stewart, Kolasch & Birch, LLP (57) ABSTRACT

A mobile terminal and a method of setting items in a mobile terminal are provided. The mobile terminal and the method of setting items in a mobile terminal can easily set positions of items in a graphic user interface including a plurality of items.

12 Claims, 11 Drawing Sheets

MOBILE TERMINAL AND METHOD OF SETTING ITEMS USING THE SAME

The present application claims priority to Korean Application No. 10-2009-0086409 filed in Korea on Sep. 14, 2009, the entire contents of which are hereby incorporated by reference in their entirety.

BACKGROUND OF THE INVENTION

1. Field of the Invention

The present invention relates to a graphic user interface, and more particularly, to a mobile terminal and a method of setting items in a mobile terminal for allowing a user to easily set items included in the graphic user interface and positions of the items.

2. Discussion of the Related Art

Conventional graphic user interfaces of various electronic devices are not user-friendly because the conventional graphic user interfaces cannot provide various options capable of setting items.

To make the most use of advantages of graphic user interfaces, it is urgently required to develop and spread a user-friendly item setting method.

SUMMARY OF THE INVENTION

Accordingly, one object of the present invention is to address the above-noted and other drawbacks of the related art.

Another object of the present invention is to provide a mobile terminal and a method of setting items in a mobile terminal for allowing a user to easily set items included in a graphic user interface and positions of the items.

To accomplish the objects of the present invention, according to an aspect of the present invention, there is provided a mobile terminal comprising a touch screen displaying a graphic user interface (GUI) having a plurality of layers each of which includes a plurality of cells for which items can be set; and a controller rotating a specific layer among the plurality of layers or at least one cell included in the specific layer according to the property of a stroke applied to the specific layer when receiving the stroke in a setting mode for setting items included in the GUI and displaying items corresponding to a plane newly exposed according to the rotation.

To accomplish the objects of the present invention, according to another aspect of the present invention, there is provided a method of setting items for a GUI in a mobile terminal, which comprises entering a setting mode for setting the items; displaying the GUI including a plurality of layers each of which has a plurality of cells for which items can be set on a touch screen included in the mobile terminal; receiving a stroke applied to a specific layer among the plurality of layers; and rotating the specific layer or at least one of cells included in the specific layer according to the property of the stroke and displaying items corresponding to a plane newly exposed according to the rotation.

According to the mobile terminal and the method of setting items in a mobile terminal, the user can easily set items included in a graphic user interface and positions of the items.

Furthermore, the types and number of items that can be set for the graphic user interface can be increased.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2b is a rear perspective view of the mobile terminal or the handheld terminal illustrated in FIG. 2a;

DETAILED DESCRIPTION OF THE PREFERRED EMBODIMENTS

Reference will now be made in detail to the preferred embodiments of the present invention, examples of which are illustrated in the accompanying drawings.

A mobile terminal described in the specification may include a cellular phone, a smart phone, a laptop computer, a digital broadcasting terminal, personal digital assistants (PDA), a portable multimedia player (PMP), a navigation system, etc.

Figure 1:
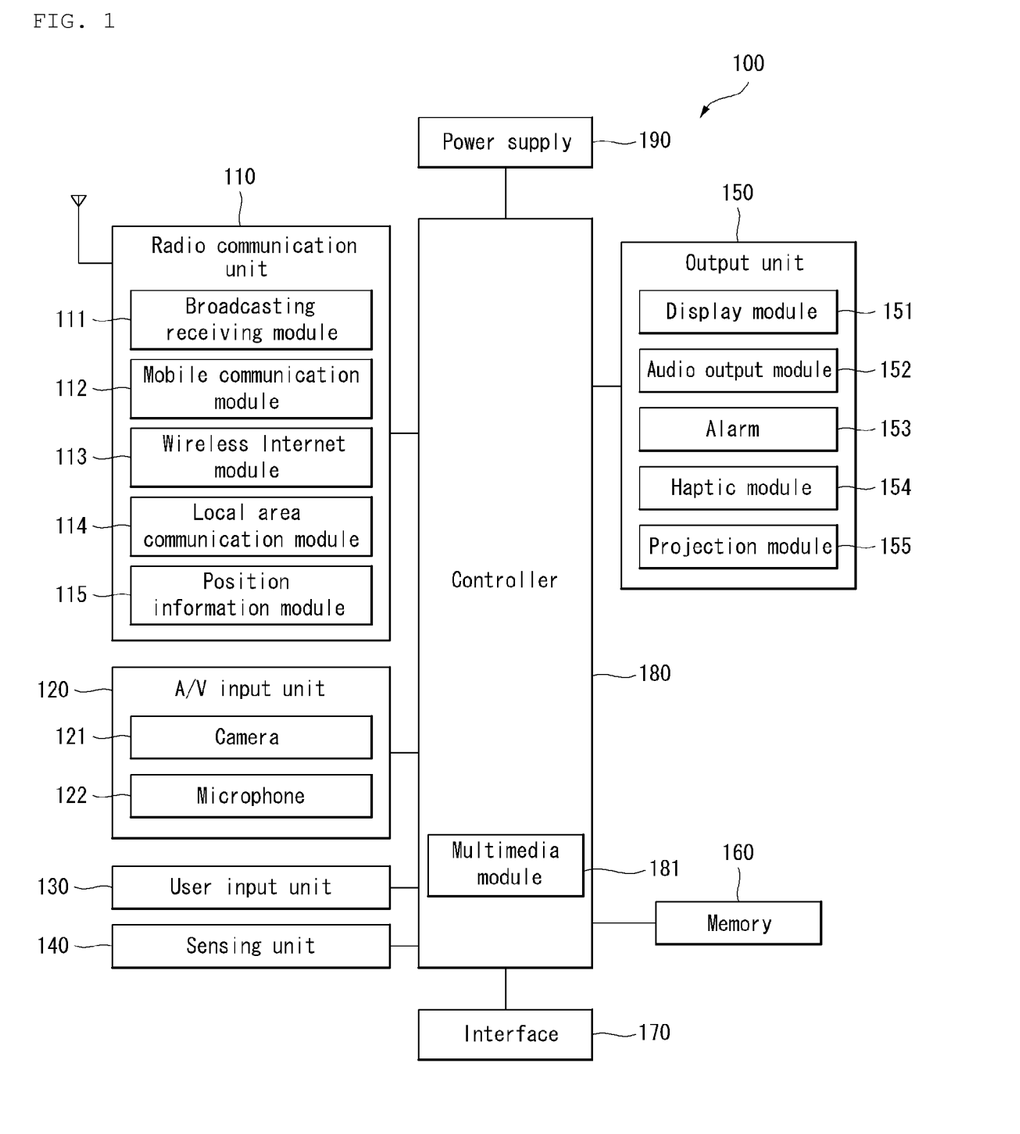
FIG. 1 is a block diagram of a mobile terminal associated with an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WEAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. The position information module 115 can obtain position information by using a global navigation satellite system (GNSS). The GNSS is a terminology used to explain radio navigation satellite systems which revolve around the earth to send reference signals to radio navigation receivers of a predetermined type such that the radio navigation receivers can determine their positions on or near the surface of the earth. The GNSS include the global position system (GPS) administrated by the United States, Galileo administrated by Europe, Global Orbiting Navigation Satellite System (GLONASS) administrated by Russia, COMPASS administrated by China and Quasi-Zenith Satellite System (QZSS) administrated by Japan.

In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc. Moreover, the audio output module 152 can output sounds through an earphone jack. The user can hear the output sounds by connecting an earphone to the earphone jack.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Embodiments of the present invention can be implemented in a computer or similar device readable recording medium by using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
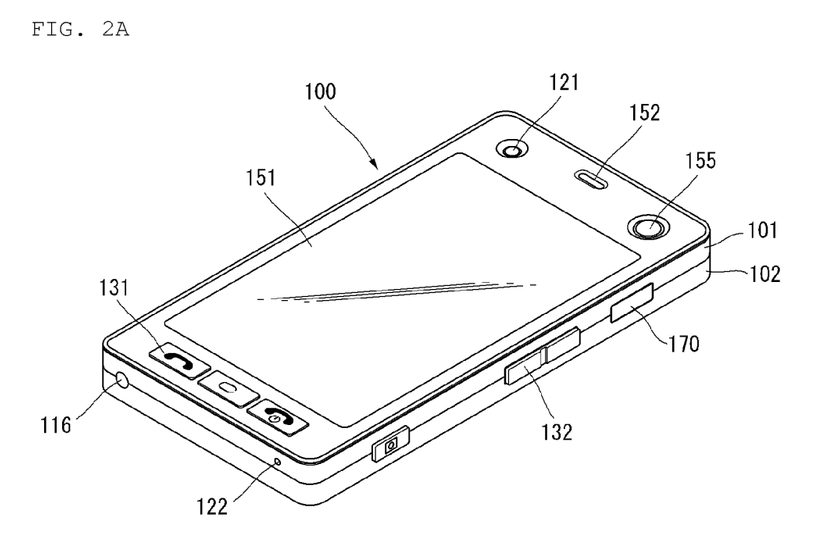
FIG. 2a is a front perspective view of a mobile terminal or a handheld terminal associated with the present invention.

FIG. 2A is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2A, the display unit 151, the audio output unit 152, the camera 121, user input units 131 and 132, the microphone 122 and the interface 170 are arranged in the terminal body, specifically, in the front case 101. In addition, the display unit 151 occupies most of the main face of the front case 101.

Further, the audio output unit 152 and the camera 121 are arranged in a region in proximity to one of both ends of the display unit 151. Also, the user input unit 131 and the microphone 122 are located in a region in proximity to the other end of the display unit 151. Also include is another user input unit 132, which is arranged with the interface 170 on the sides of the front case 101 and the rear case 102.

Thus, in this embodiment, the user input unit 130 includes multiple operating units 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling.

Also, the operating units 131 and 132 can receive various inputs. For example, the operating unit 131 receives commands such as start and end a call, and the operating unit 132 receives commands such as to control the volume of the sound output from the audio output unit 152 or to convert the display unit 151 into a touch recognition mode.

Figure 2B:
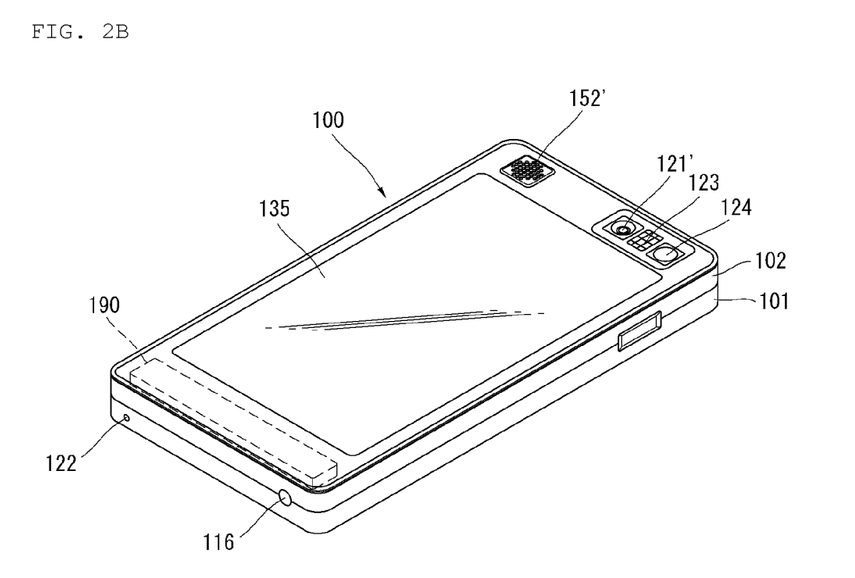

Next, FIG. 2B is a rear perspective view of the handheld terminal shown in FIG. 2A according to an embodiment of the present invention. As shown in FIG. 2B, a camera 121' is additionally attached to the rear side of the terminal body, that is, the rear case 102. In this configuration, the camera 121' has a photographing direction that is opposite to that of the camera 121 shown in FIG. 2a and can have pixels different from those of the camera 121 shown in FIG. 2A.

For example, in one example, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2B, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2A and be used in a speaker phone mode when the terminal is used for a telephone call.

A broadcasting signal receiving antenna 124 can also be additionally attached to a side of the terminal body in addition to an antenna for telephone calls. The antenna 124 forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2B also illustrates a touch pad 135 for sensing touch additionally attached to the rear case 102 of the terminal 100. Further, the touch pad 135 can be a light transmission type as the display module 151. In this instance, when the display module 151 outputs visual information through both sides, the visual information can be recognized through the touch pad 135.

Also, the information output through both sides of the display module 151 can be controlled by the touch pad 135. In addition, a display can be additionally attached to the touch pad 135 such that a touch screen can be arranged even in the rear case 102. Further, the touch pad 135 operates in connection with the display module 151 of the front case 101, and can be located in parallel with the display module 151 behind the display module 151. The touch panel 135 can also be identical to or smaller than the display unit 151 in size.

The interoperations of the display unit 151 and the touch pad 135 will now be described with reference to FIGS. 3A and 3B. In more detail, FIGS. 3A and 3B are front views of the handheld terminal 100 and are used for explaining an operating state of the handheld terminal according to an embodiment of the present invention.

The display module 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
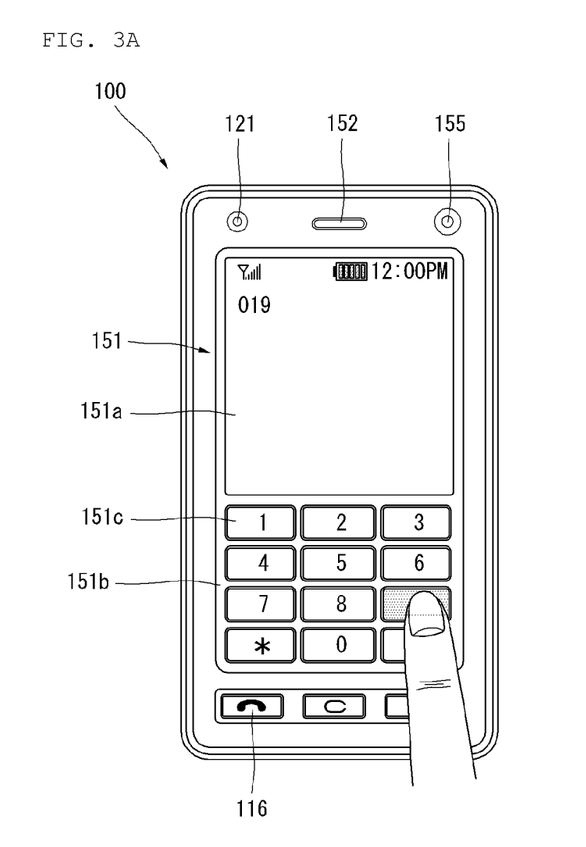
FIGS. 3a and 3b are front views of handheld terminals associated with the present invention for explaining an operating state of the handheld terminals.
Figure 3B:
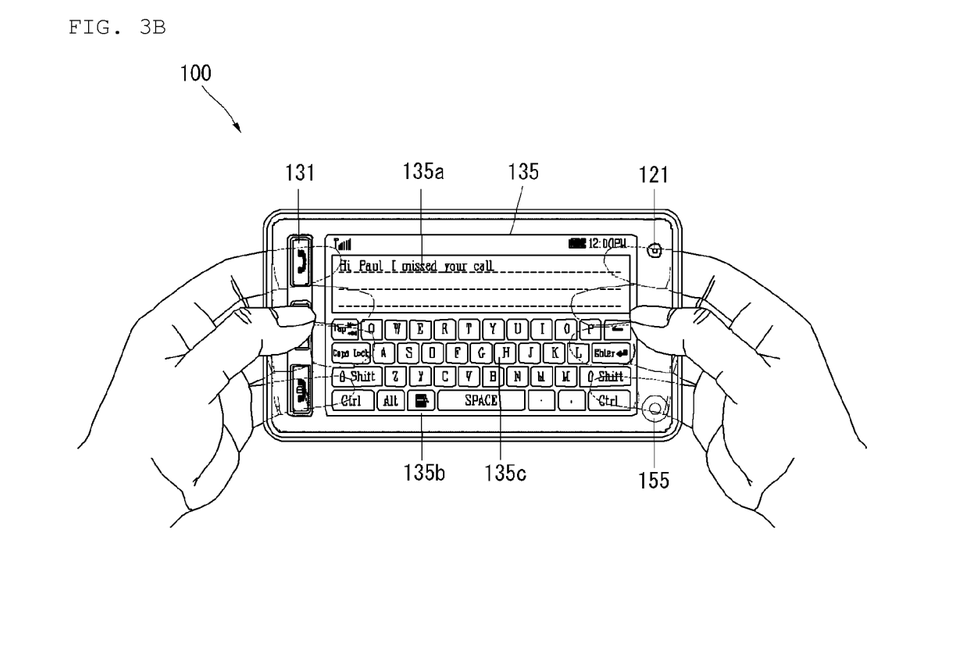

Further, FIG. 3A shows that touch applied to a soft key is input through the front side of the terminal body. The display module 151 can be a single area or can be divided into a plurality of regions. In the latter instance, the display unit 151 is constructed such that the plurality of regions interoperate with each other.

For example, and as shown in FIG. 3A, an output region 151a and an input region 151b are respectively displayed in upper and lower parts of the display module 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first operating unit 116, a connection of a call corresponding to a telephone number displayed on the output region 151a is attempted.

Next, FIG. 3B is an overview of the mobile terminal 100 showing that touch applied to soft keys is input through the rear side of the terminal body. FIG. 3B also shows the landscape of the terminal body while FIG. 3A shows the portrait of the terminal body. In addition, the display unit 151 is constructed such that an output image is converted according to the direction in which the terminal body is located.

Further, FIG. 3B shows the operation of the handheld terminal in a text input mode. As shown, the display unit 151 includes a touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of QWERTY keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with user's fingers when the soft keys 135c are touched as compared to touch input through the display unit 151. Further, when the display unit 151 and the touch pad 135 are transparent, the user can see his or her fingers located behind the terminal body, and thus can select items by touching the backside or surface of the displayed keys 135c.

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

Embodiments of the present invention will now be explained. It is assumed that the display unit 151 corresponds to a touch screen for convenience of explanation. As described above, the touch screen 151 can perform both the function of displaying information and the function of inputting information. However, the present invention is not limited thereto. Further, touch may include contact touch and proximity touch. The proximity touch will be explained in detail later with reference to FIG. 14.

Figure 4:
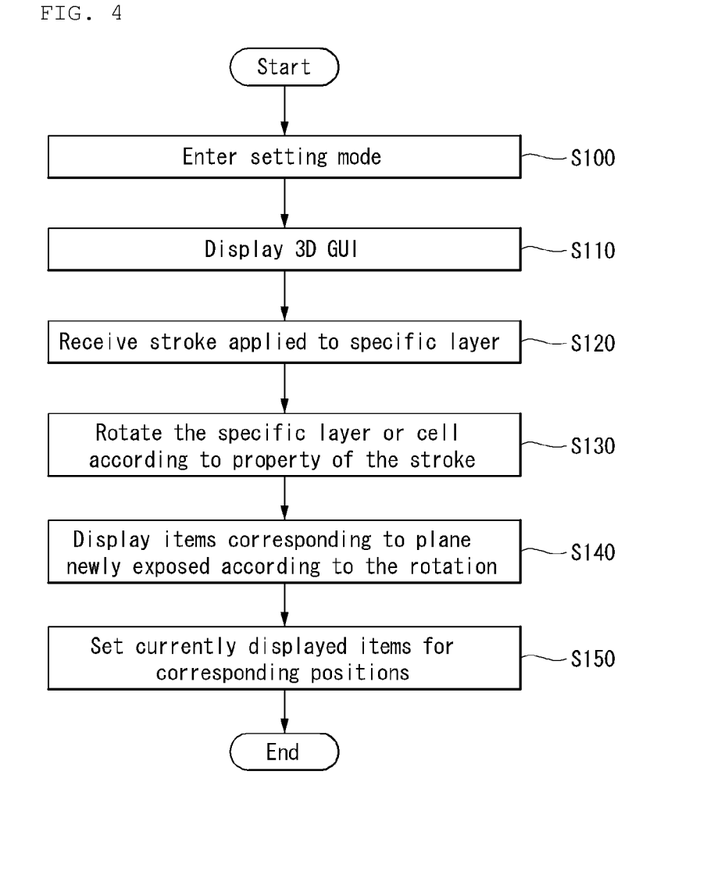
FIG. 4 is a flowchart showing a method of setting items in a mobile terminal according to an embodiment of the present invention.
Figure 5:
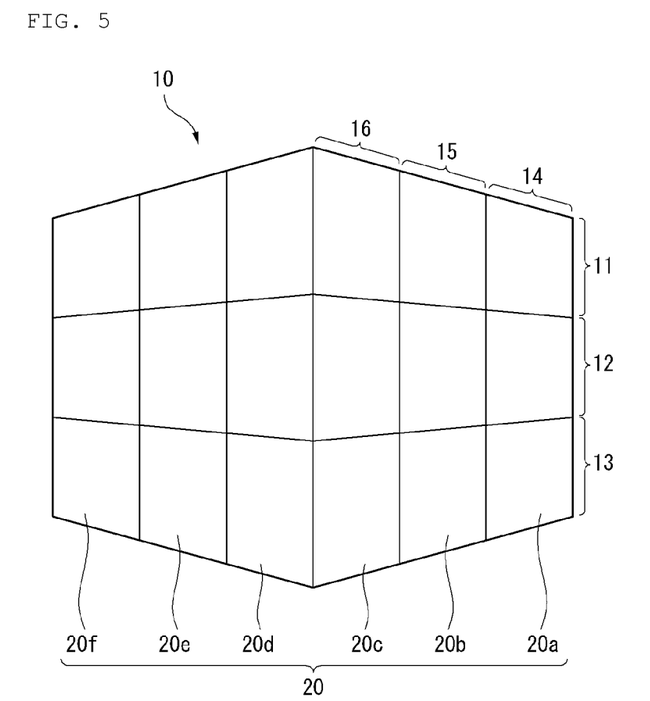
FIG. 5 illustrates an exemplary three-dimensional (3D) graphic user interface according to an embodiment of the present invention.
Figure 6:
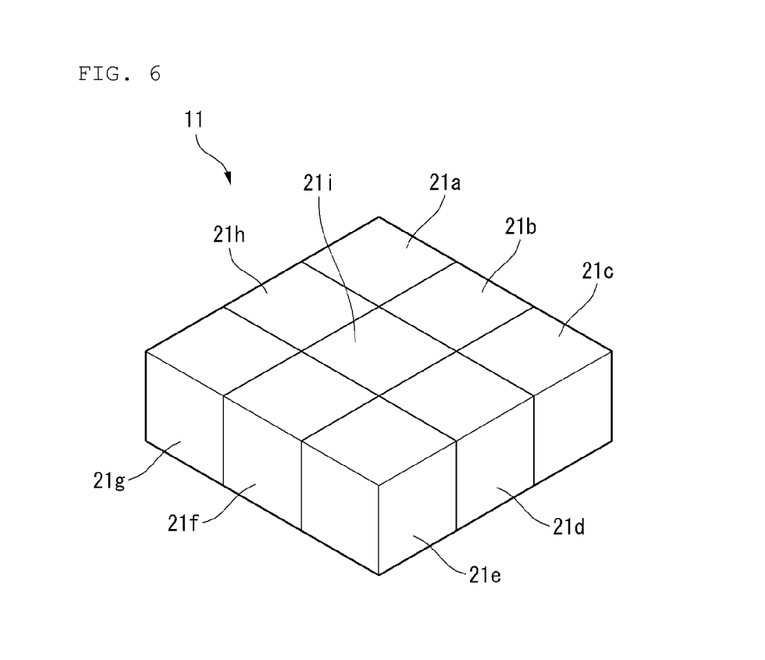
FIG. 6 illustrates a layer included in the 3D graphic user interface illustrated in FIG. 5.
Figure 7:
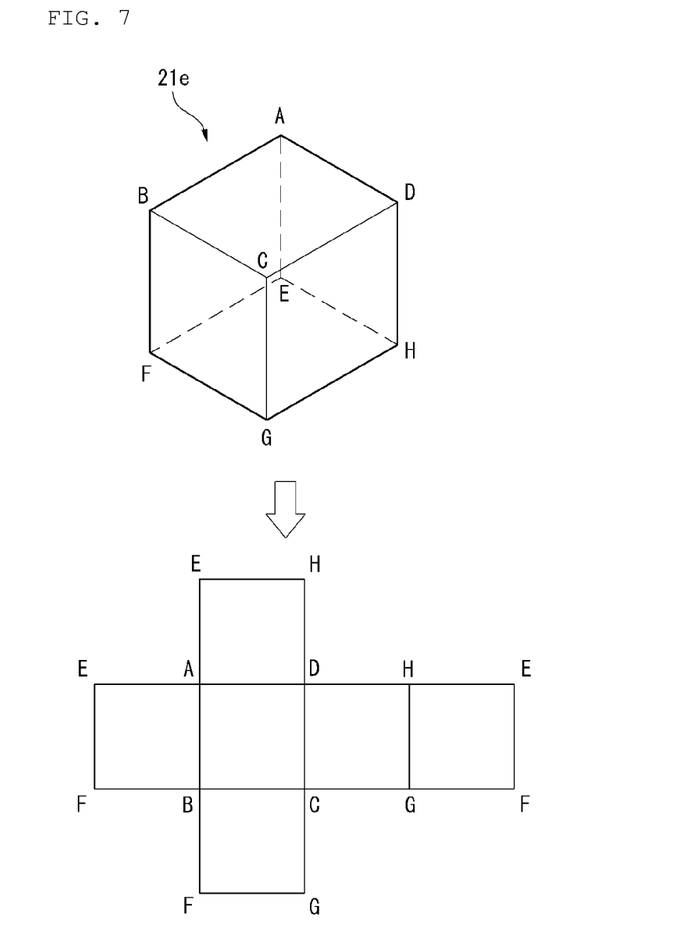
FIG. 7 illustrates a 3D cell included in the layer illustrated in FIG. 6.
Figure 8:
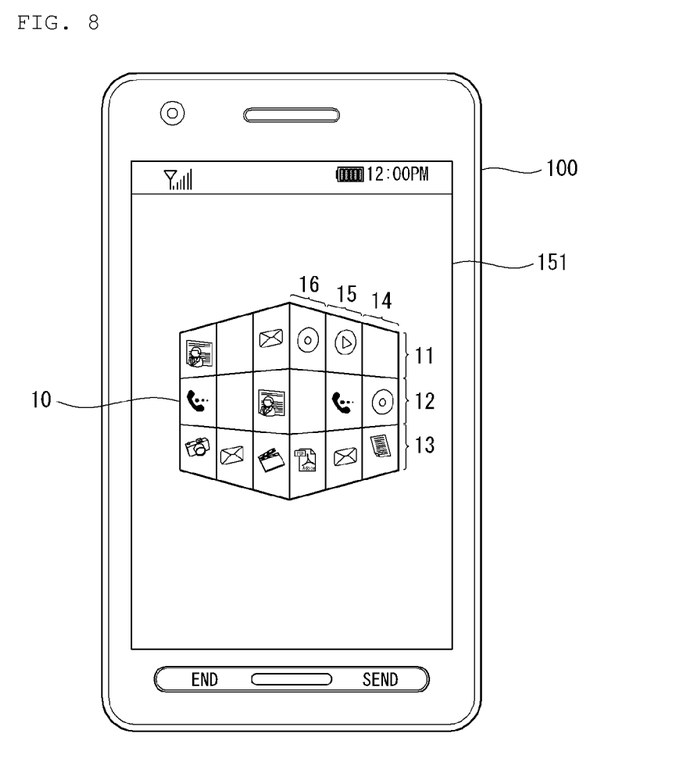
FIG. 8 illustrates an exemplary screen displaying the 3D graphic user interface illustrated in FIG. 5.

FIG. 4 is a flowchart showing a method of setting items in a mobile terminal according to an embodiment of the present invention and FIG. 5 illustrates an exemplary three-dimensional (3D) graphic user interface according to an embodiment of the present invention. FIG. 6 illustrates a layer included in the 3D graphic user interface illustrated in FIG. 5 and FIG. 7 illustrates a 3D cell included in the layer illustrated in FIG. 6. FIG. 8 illustrates an exemplary screen displaying the 3D graphic user interface illustrated in FIG. 5 and FIGS. 9 through 13 are views for explaining the method of setting items in a mobile terminal and the operation of the mobile terminal according to an embodiment of the present invention.

A method of setting items in a mobile terminal according to a first embodiment of the invention can be implemented in the mobile terminal 100 described with reference to FIGS. 1, 2 and 3. The method of setting items in a mobile terminal according to the first embodiment of the invention and the operation of the mobile terminal 100 for implementing the method of setting items will now be explained with reference to the attached drawings.

Referring to FIGS. 1 and 4, the controller 180 enters a setting mode for setting items corresponding to a three-dimensional (3D) graphic unit interface (GUI) provided by the mobile terminal 100 in step S100.

In the specification, items may include menus, contents, functions and applications, for example. When the items corresponding to the 3D GUI are selected, menus, contents, functions or applications corresponding to the items can be executed. The menus, contents, functions, applications and associated information may be stored in the memory 160.

Referring to FIG. 5, the 3D GUI 10 includes a plurality of layers 11, 12, 13, 14, 15 and 16. The plurality of layers 11, 12, 13, 14, 15 and 16 may be recognized as horizontal layers 11, 12 and 13 or vertical layers 14, 15 and 16. Each of the plurality of layers includes a plurality of cells 20. The cells may be three-dimensional or two-dimensional.

FIG. 6 illustrates the specific layer 11 included in the 3D GUI 10 illustrated in FIG. 5 in detail. Referring to FIG. 6, the specific layer 11 may include nine cells 21a, 21b, 21c, 21d, 21e, 21f, 21g, 21h and 21i. At least one item may correspond to each of the nine cells 21a through 21i.

FIG. 7 illustrates the specific cell 21e included in the specific layer 11 illustrated in FIG. 6 and an unfolded view of the specific cell 21e. Referring to FIG. 7, the specific cell 21e may have six same planes. A specific item may set or correspond to each plane of the specific cell 21e.

The controller 180 displays the 3D GUI 10 on the touch screen 151 in the setting mode in step S110.

FIG. 8 illustrates an example of displaying the 3D GUI 10 on the touch screen 151. FIG. 8 shows the screen for setting items corresponding to the 3D GUI 10.

Figure 9:
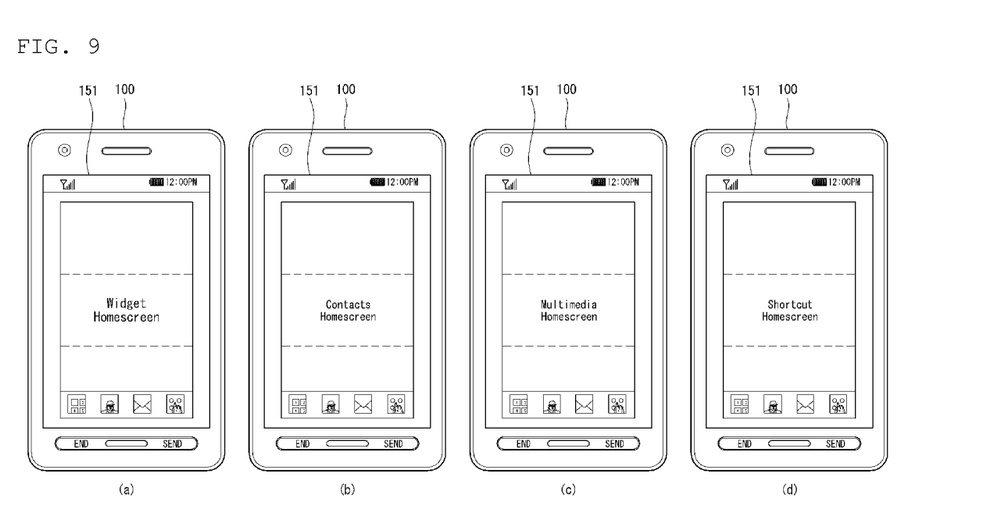
FIGS. 9 through 13 are views for explaining the method of setting items in a mobile terminal and the operation of the mobile terminal according to an embodiment of the present invention.

FIG. 9 illustrates various exemplary planes included in the 3D GUI 10. As shown in FIG. 9, the 3D GUI 10 may have a plane including menus associated with a widget function (refer to FIG. 9(a)), a plane including items corresponding to telephone numbers (refer to FIG. 9(b)), a plane including menus associated with a multimedia function and/or multimedia contents (refer to FIG. 9(c)), and a plane including items corresponding to various functions and/or applications (Refer to FIG. 9(d)).

The planes shown in FIG. 9 are exemplary and the items corresponding to the 3D GUI 10 and positions of the items can be changed and set by a user in a manner disclosed in the specification.

The user can set the items included in the 3D GUI 10 by operating the 3D GUI 10 illustrated in FIG. 8.

The controller 180 receives a stroke applied to a specific layer among the plurality of layers included in the 3D GUI 10 in step S120, rotates the specific layer or at least one cell included in the specific layer according to the property of the received stroke in step S130 and displays items corresponding to a plane newly exposed according to the rotation in step S140. The stroke includes a flicking operation and a dragging operation.

Figure 10:
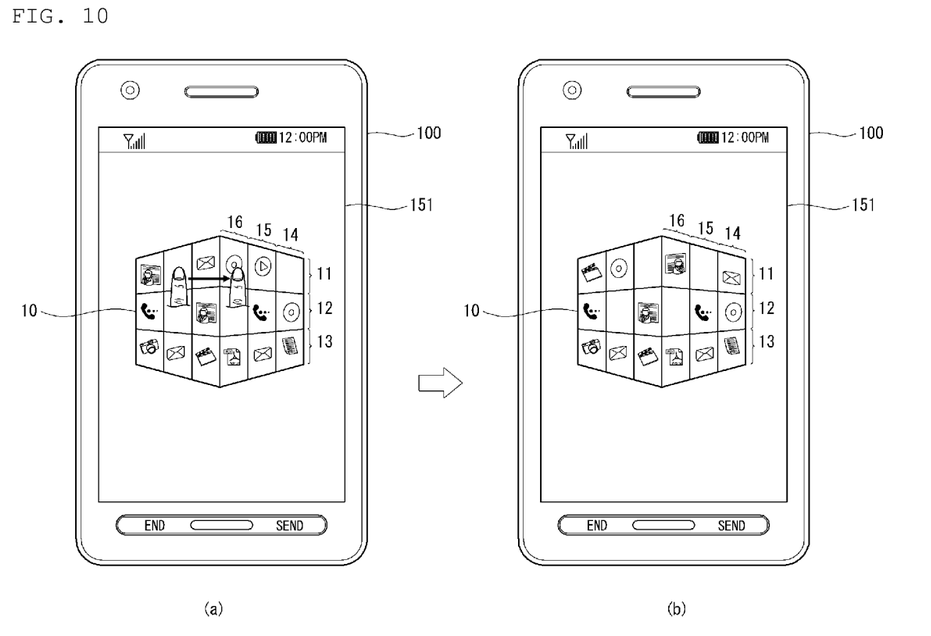
Figure 11:
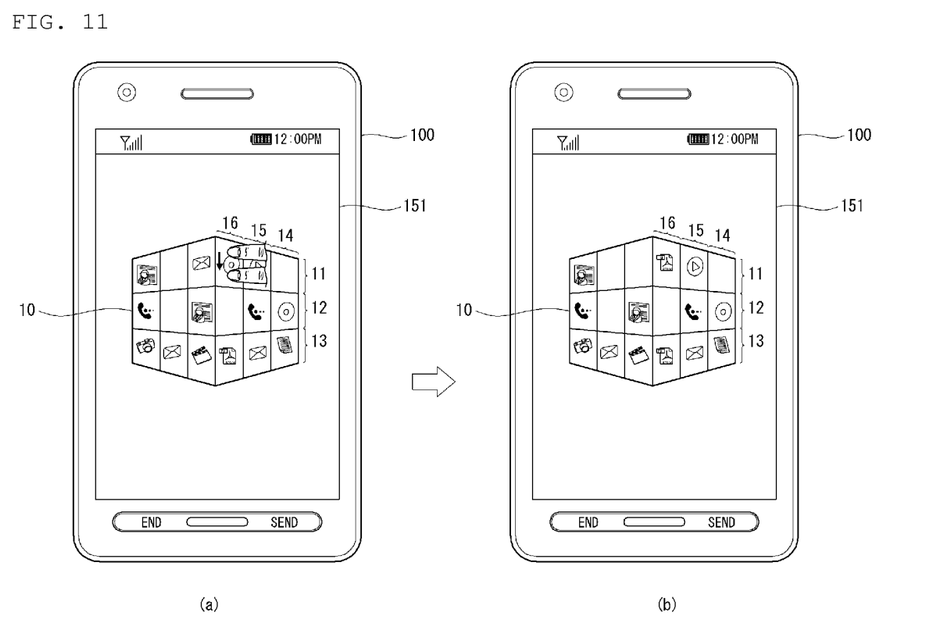

Referring to FIGS. 10 and 11, the user can apply a stroke to the specific layer 11 included in the 3D GUI 10 with his or her finger.

The controller 180 analyzes the property of the stroke and rotates the specific layer 11 to which the stroke is applied or rotates at least one cell included in the specific layer 11.

The property of the stroke can be analyzed in various manners. For example, the controller 180 rotates the specific layer 11 when the stroke is applied to at least two cells included in the specific layer 11, as shown in FIG. 10. Further, the controller 180 rotates the specific cell 21e included in the specific layer 11 when the stroke is applied to only the specific cell 21e, as shown in FIG. 11.

The controller 180 can determine the extent of the rotation based on at least one of the distance, velocity and acceleration of the stroke. For example, the controller 180 can rotate a corresponding cell or layer to a great extent or rapidly rotate the corresponding cell or layer when the user quickly applies the stroke.

Further, the controller 180 can be set such that the controller 180 rotates a corresponding cell or layer only to a predetermined extent all the time when receiving the stroke irrespective of the distance, velocity and acceleration of the stroke. For example, the controller 180 can rotate the corresponding cell or layer by 90° when receiving the stroke.

Further, the controller 180 can determine whether to rotate a layer or a cell in consideration of time for which the stroke is applied. For example, the controller 180 can rotate a cell corresponding to the point to which the stroke is applied when the stroke is applied within a predetermined time. Further, the controller 180 can rotate a layer corresponding to the point to which the stroke is applied when the stroke is applied for longer than the predetermined time.

In addition, the controller 180 can rotate the cell or layer in a direction corresponding to the stroke. The corresponding direction may correspond to the direction in which the stroke is applied or a direction predetermined for a specific direction of the stroke.

As shown in FIGS. 10 and 11, the controller 180 displays items corresponding to planes newly exposed according to the rotation of the layer or cell. Referring to FIG. 10, the controller 180 rotates the layer 11 to the right by 90° because the user applies a stroke to three cells in the right direction (refer to FIG. 10(a)). Accordingly, items corresponding to planes newly exposed according to the rotation of the layer 11 are displayed (refer to FIG. 10(b)).

Referring to FIG. 11, since the user applies a stroke to a specific cell downward (refer to FIG. 11(a)), the controller 180 rotates the specific cell downward. Accordingly, the item displayed on the specific cell disappears and items corresponding to planes newly exposed according to the rotation of the specific cell are displayed (refer to FIG. 11(b)). Items corresponding to a newly exposed plane may be previously determined.

Consequently, the overall structure of the 3D GUI 10 is variable according to rotation of a layer or a cell, and the 3D GUI 10 can be composed in various manners according to the user. Further, cells can be rotated, and thus the types and number of items that can be set for the 3D GUI can be increased.

Figure 12:
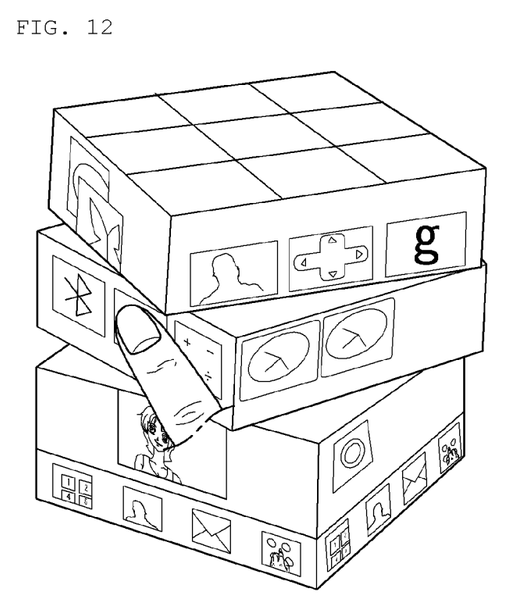
Figure 13:
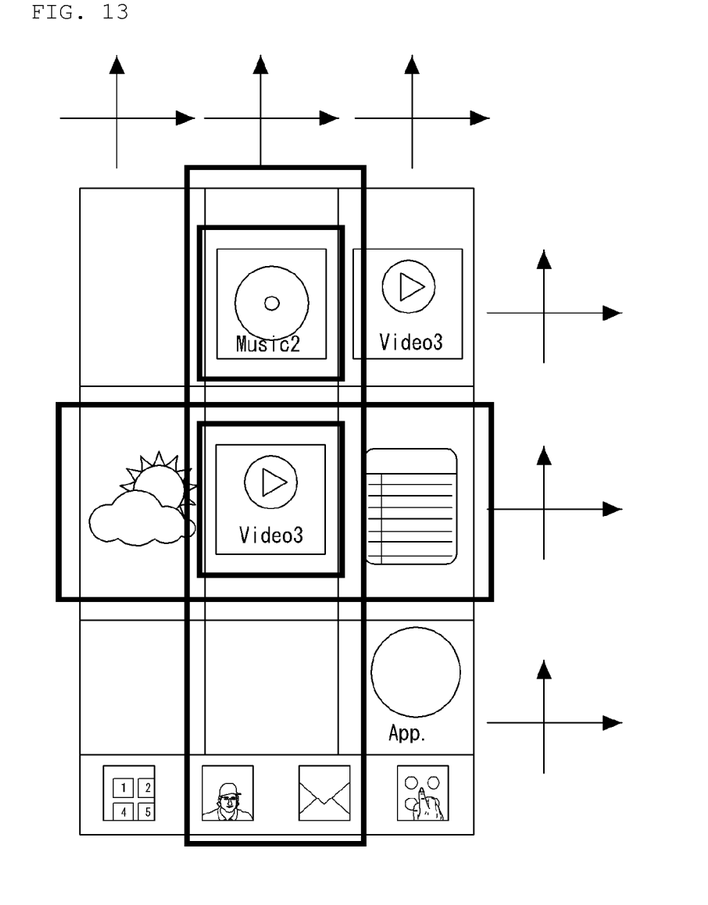

FIG. 12 is a conceptional view showing that the layers of the 3D GUI 10 can respectively rotate and FIG. 13 is a conceptional view showing that the plurality of layers and the plurality of cells constructing the 3D GUI 10 can respectively rotate.

The controller 180 can provide a tool or a user interface capable of changing or setting items corresponding to a specific cell or a specific plane.

The controller 180 sets the currently displayed items for corresponding positions according to a predetermined command signal in step S150. The predetermined command signal includes at least one of a lapse of predetermined time or a predetermined touch signal.

For example, when the user applies the stroke as shown in FIG. 10(a), the image shown in FIG. 10(a) is changed to the image shown in FIG. 10(b). After a lapse of predetermined time, the items displayed in FIG. 10(b) are set in the current positions.

Further, the controller 180 can provide a function button to which completion of the setting mode is allocated to the touch screen 151. The user can select the function button to set the currently displayed items in the corresponding positions.

The predetermined command signal can be input through a physical key button attached to the mobile terminal 100.

Figure 14:
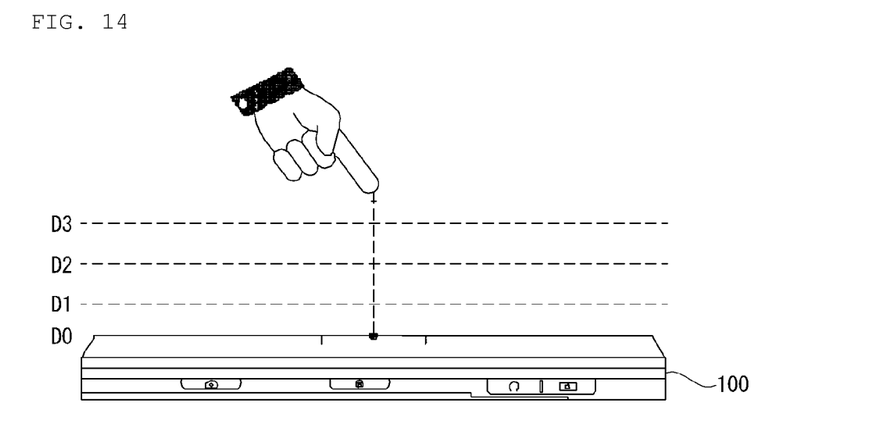
FIG. 14 is a conceptional view for explaining a proximity depth of a proximity sensor.

The proximity sensor described with reference to FIG. 1 will now be explained in more detail with reference to FIG. 14. FIG. 14 is a conceptional view for explaining a proximity depth of the proximity sensor.

As shown in FIG. 14, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 14 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 14, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance EC and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

The above-described information displaying method in a mobile terminal according to the present invention can be written as computer programs and can be implemented in digital computers that execute the programs using a computer readable recording medium. The information displaying method in a mobile terminal according to embodiments of the present invention can be executed through software. The software can include code segments that perform required tasks. Programs or code segments can also be stored in a processor readable medium and transmitted.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal comprising:
   a touch screen configured to display a graphic user interface (GUI) having a plurality of layers, each layer including a plurality of cells for which items can be set; and
   a controller configured to rotate a specific layer among the plurality of layers or at least one cell included in the specific layer according to a touch input applied to the specific layer when receiving the touch input in a setting mode for setting items included in the GUI and display items corresponding to a plane newly exposed according to the rotation,
   wherein remaining layers of the plurality of layers are not rotated when the specific layer is rotated, or remaining cells of the plurality of cells are not rotated when the at least one cell is rotated,
   wherein the controller is further configured to rotate a layer including at least two cells and display items corresponding to a newly exposed plane of the rotated layer when the touch input is applied to the at least two cells, and
   wherein the controller is further configured to rotate the specific layer or the at least one cell rapidly or to increase the extent of the rotation of the specific layer or the at least one cell as velocity or acceleration of the received touch input is increased.

2. The mobile terminal of claim 1, wherein the plurality of cells and the plurality layers are rotatable in at least one of horizontal and vertical directions.

3. The mobile terminal of claim 2, wherein the controller is further configured to set currently displayed items for corresponding positions according to a predetermined command signal including at least one of a lapse of predetermined time and a predetermined touch signal.

4. The mobile terminal of claim 1, wherein the controller is configured to rotate a specific cell and display items corresponding to a plane newly exposed according to the rotation of the specific cell when the touch input is applied to the specific cell.

5. The mobile terminal of claim 1, wherein the controller is configured to rotate a cell corresponding to the point to which the touch input is applied and display items corresponding to a plane newly exposed according to the rotation of the cell when the touch input is applied within a predetermined time, or to rotate a layer corresponding to the point to which the touch input is applied and display items corresponding to a newly exposed plane of the rotated layer when the touch input is applied for longer than the predetermined time.

6. The mobile terminal of claim 1, wherein the controller is configured to rotate the cell or the specific layer in a direction corresponding to the direction of the touch input.

7. The mobile terminal of claim 1, wherein the touch input includes a flicking operation and a dragging operation.

8. A method of setting items for a GUI in a mobile terminal, the method comprising:
   entering a setting mode for setting the items;
   displaying the GUI including a plurality of layers, each layer having a plurality of cells for which items can be set on a touch screen included in the mobile terminal;
   receiving a touch input applied to a specific layer among the plurality of layers; and
   rotating the specific layer or at least one of cells included in the specific layer according to the property of the touch input and displaying items corresponding to a plane newly exposed according to the rotation,
   wherein remaining layers of the plurality of layers are not rotated when the specific layer is rotated, or remaining cells of the plurality of cells are not rotated when the at least one cell is rotated,
   wherein the rotating the specific later or at least one of cells comprises rotating the specific layer or the at least one cell rapidly or to increase the extent of the rotation of the specific layer or the at least one cell as velocity or acceleration of the received touch input is increased, and
   wherein the displaying the items comprises rotating a layer including at least two cells and displaying items corresponding to a newly exposed plane of the rotated layer when the touch input is applied to the at least two cells.

9. The method of claim 8, wherein the plurality of cells and the plurality of layers are rotatable in at least one of horizontal and vertical directions and the plurality of layers form a polyhedron.

10. The method of claim 8, further comprising setting currently displayed items for corresponding positions according to a predetermined command signal including at least one of a lapse of predetermined time and a predetermined touch signal.

11. The method of claim 8, wherein the displaying of the items comprises:
rotating a cell corresponding to the point to which the touch input is applied and displaying items corresponding to a plane newly exposed according to the rotation of the cell when the touch input is applied within a predetermined time;or rotating a layer corresponding to the point to which the touch input is applied and displays items corresponding to a newly exposed plane of the rotated layer when the touch input is applied for longer than the predetermined time.

12. The method of claim 8, wherein the rotation is performed in a direction corresponding to the direction of the touch input.

* * * * *